July 20, 1954   O. R. CARPENTER ET AL   2,684,426
WORK SUPPORTING APPARATUS FOR FUSION WELDING
Filed Dec. 13, 1950   2 Sheets-Sheet 1

INVENTORS
Otis R. Carpenter
BY James C. Fesler
ATTORNEY

July 20, 1954     O. R. CARPENTER ET AL     2,684,426

WORK SUPPORTING APPARATUS FOR FUSION WELDING

Filed Dec. 13, 1950     2 Sheets-Sheet 2

INVENTORS
*Otis R. Carpenter*
BY *James C. Fesler*

ATTORNEY

Patented July 20, 1954

2,684,426

UNITED STATES PATENT OFFICE 2,684,426

WORK SUPPORTING APPARATUS FOR FUSION WELDING

Otis R. Carpenter, Barberton, and James C. Fesler, Alliance, Ohio, assignors to The Babcock & Wilcox Company, New York, N. Y., a corporation of New Jersey Application December 13, 1950, Serial No. 200,673

4 Claims. (Cl. 219—8)

This invention relates to work supporting apparatus for fusion welding and, more particularly, to such apparatus useful in the fusion welding of projecting studs or the like to elongated metal elements such as tubes and pipes.

Tubes used in vapor generators or heat exchange apparatus frequently have their heating surfaces extended by attachment thereto, or formation therewith, of projecting studs, fins, or the like. These studs are attached to the external surface of the tube to project therefrom, and the studs may lie in a single plane or row longitudinally of the tube, or may be disposed in several rows which are spaced peripherally of the tube.

The studs have conveniently been united with the tube by resistance welding, for example, although other processes may be used. In some installations, it is desirable that the projecting studs be contiguous to form a substantially solid flange or wall along the tube. In the weld uniting of contiguous studs to the tubes by resistance welding, problems are encountered due to shunt current effects, the provision of special welding dies, and the maintenance of accurate positioning of the studs, such accurate positioning being adversely affected by warpage of the tube.

The present invention is directed to apparatus whereby one or more rows of contiguous studs may be welded to a tube without encountering the aforementioned problems of shunt current effects, provision of special welding dies, and inaccurate positioning due to tube warpage. To this end, the apparatus includes an elongated jig including saddles for supporting the tube, bar, or other elongated element, and positioning means for positioning the studs for welding to such element. The jig is arranged to be rotated about its axis or longitudinal center line. The stud positioning means includes a pair of plates extending substantially parallel to a tube supported in the jig, and upwardly at small acute angles to the horizontal axial plane through the tube and these plates are arranged to have the studs, which are generally bars of circular or rectangular cross section, laid thereon in contiguous relation. Suitable stud alignment means are associated with each plate for holding the studs with their outer ends in longitudinal alignment and with their inner ends in substantially juxtaposed relation with the tube wall. The studs have flat ends so that, when adjacent the tube wall, a welding V is automatically provided between the flat end of the stud and the curved tube wall.

Adjacent a framework supporting the jig is a further framework supporting a track extending parallel to the jig. This track carries a carriage on which are mounted a pair of submerged arc welding heads, including flux supply means and reels of welding wire. The two (2) welding heads are so disposed that each feeds its welding wire to one of the aforementioned grooves between the stud ends and the tube surfaces, the welding points being aligned perpendicularly of the tube axis. The carriage carries a spring biased pivoted arm having a roller in its free end engageable with the tube in advance of the welding zone to hold the tube firmly positioned in its saddles until the weld has been completed.

A motor is provided to drive the carriage along the track, preferably through a rack and pinion arrangement, the spring pressed arm traveling along with the carriage. The unwelded length of the tube is preferably firmly clamped in position, whereas the welded end is preferably not clamped into its saddle. This allows the tube to bend upwardly in the welded portion due to differential expansion caused by the unbalanced heating, the tube being easily straightened after the rows of studs have been welded thereto.

Preferably, the studs are attached to the tube surfaces along lines beneath the horizontal axial plane through the tube so as to leave 180° of tube surface free of studding. Also, the studs are initially positioned so that they lie at a slight angle to such horizontal axial plane whereby, when the outer ends of the studs bend upwardly due to cooling and contraction of the weld, the studs will extend substantially parallel to such plane. Suitable welding transformer arrangements are provided for simultaneously delivering welding current to both heads, a control panel for the rate of rod feed, carriage travel, and similar factors being preferably mounted on the carriage.

For an understanding of the invention principles, reference is made to the following description of a typical embodiment thereof as illustrated in the accompanying drawings.

Figure 1:
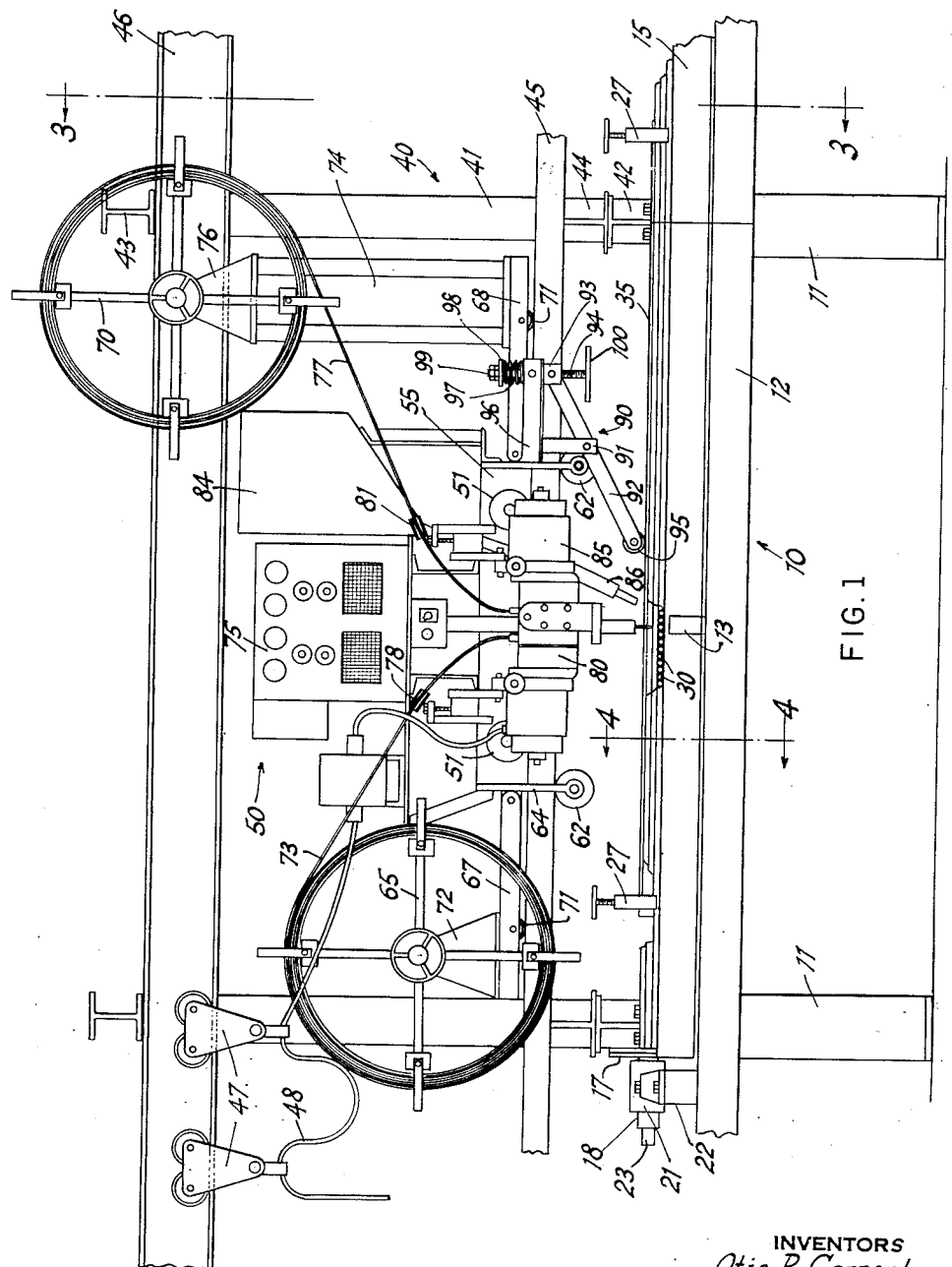
Fig. 1 is a side elevation view of stud welding apparatus embodying the invention.
Figure 2:
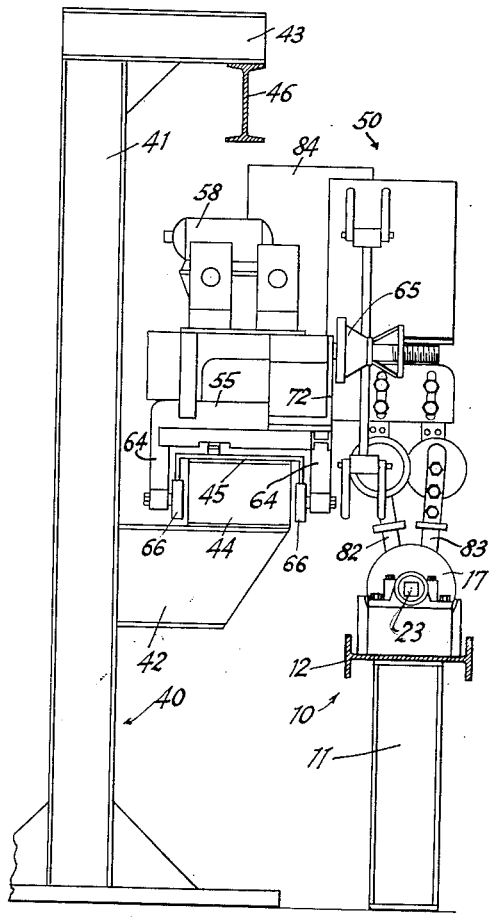
Fig. 2 is a left end elevation view of the apparatus shown in Fig. 1.
Figure 3:
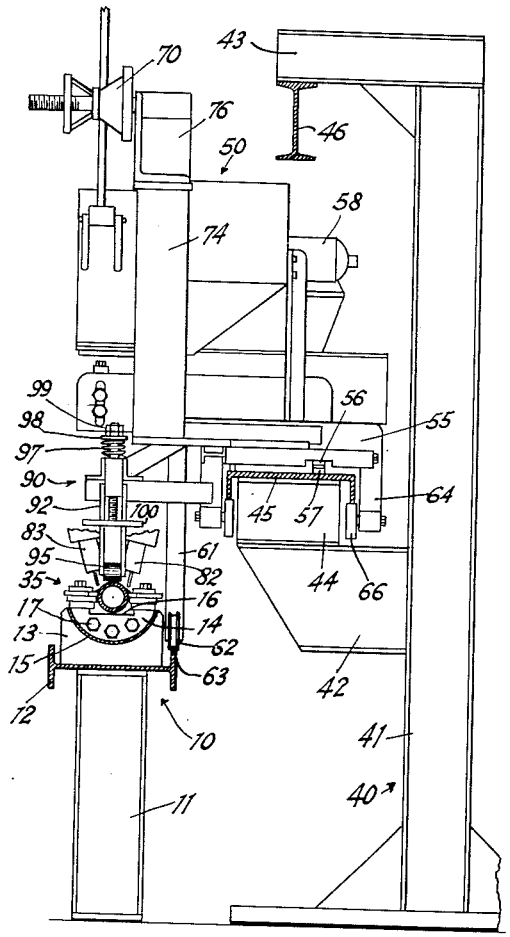
Fig. 3 is a sectional view on the line 3—3 of Fig. 1.
Figure 5:
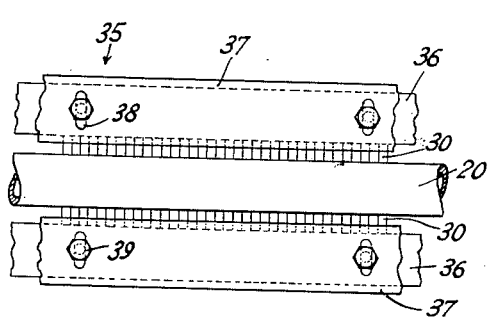
Fig. 5 is a top plan view of the jig as shown in Fig. 4.
Figure 4:
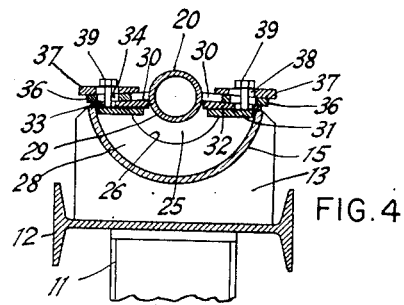
Fig. 4 is an enlarged sectional view on the line 4—4 of Fig. 1.

Referring to the drawings, the invention apparatus includes an elongated frame, generally indicated at 10, comprising columns 11 and horizontally extending I-beam frame members 12. Frame 10 is preferably made in a plurality of interfitted sections whereby the apparatus may be any length desired depending on the length of tubing or other work to be studded. Supported on frame 10 are a plurality of bearing blocks 13 each having an arcuately recessed upper surface, and these bearing blocks support an elongated, sectional, semi-cylindrical, hollow jig base 15 which is made up of mating sections suitably bolted together to accommodate the desired length of workpiece. The sections of jig base 15 may, for example, be formed by severing a 10 inch diameter pipe along an axial plane, and each block 13 engages an intermediate portion of a jig base section.

The several sections of frame or support 10 may be joined together by bolting the ends of members 12 to columns 11. The jig base sections 15 are provided with generally semi-circular walls 14 at their ends, each having a notch or recess 16 in its upper surface, and each welded or otherwise secured within a jig base section. The jig base sections are united as a unit by bolting together the walls 14 at abutting ends of jig base sections, as indicated at 17.

At least one end jig base section has a circular trunnion plate or block 17 secured thereto at its outer end, these trunnion blocks being formed with trunnions 18 bearing in pillow blocks 21 supported on blocks 22 on frame members 12. The outer end of the trunnion 18 is squared, as at 23, to receive a wrench or the like whereby the connected jig sections 15 may be adjusted about their common axis.

The workpiece, such as a tube 20, is supported in jig base 15 by means of substantially semi-circular support blocks 28 each having a semi-circular recess 26 in its upper surface. The recesses 26 of blocks 28 interchangeably receive substantially semi-circular saddles 25 having recesses 29 of different radii to accommodate different sizes of tube 20 in the same jig. When tube 20 is disposed in the saddles 25, it may be held firmly therein by adjustable clamps 27 at spaced points along its length. Preferably, however, only the unwelded portion of the tube is tightly clamped in position, the welded portion of the tube being progressively released free to bow upwardly as a result of unbalanced heating induced therein by the welding of the studs 30 thereto. After the stud welding is completed, the bowed tube may be suitably straightened.

A pair of shelves 31 are secured to each jig base section 15, being supported on the horizontal upper surfaces of the blocks 14 so as to extend longitudinally along each side of tube 20. These shelves serve to mount the stud positioning means generally indicated at 35. Each jig positioning means includes a first or lower plate 32 extending along a shelf 31 and having transversely extending longitudinal slots 33 therein whereby plates 32 may be adjusted laterally of the shelves 31 in accordance with the size of tube 20.

On top of each plate 32 is an intermediate or second plate 36 serving as an alignment bar for the outer ends of the studs 30. Each plate 36 has transversely extending slots 34 aligned with slots 33 and somewhat longer than the latter, whereby bars or plates 36 are adjustable laterally to accommodate studs of varying length.

Lying on each plate 36 is a third or clamping cover plate 37 having transverse slots 38 aligned with slots 33 and 34 and substantially equal in length to slots 34. Plates 37 are wider than plates 36 so that their inner edges extend inwardly beyond the inner edges of alignment bars 36 to overlie studs 30. Plates 32, 36 and 37 are assembled to shelves 31 by means of cap bolts 39 extending through slots 33, 34 and 38 and threaded into shelves 31.

In setting up the welding operation, bolts 39 are loosened and plates 32 are moved inwardly to contact the surface of tube 20. These plates have the dual function of serving as backing up bars to hold the weld material in the grooves between the stud inner ends and the tube surface, and to support the rows of studs in properly oriented position relative to tube 20.

As previously stated, studs 30 are secured to tube 20 so as to extend in a common plane parallel to an axial plane through the tube but offset from such axial plane so as to leave the tube surface stud free through at least a 180° arc. In order that the studs, when welded to the tube, will lie in such common plane, it is necessary that the studs be positioned initially to extend inwardly and upwardly toward the tube surface at a small acute angle to the horizontal axial plane through the tube. As the weld deposit shrinks or contracts on cooling, the studs are pulled upwardly into a horizontal plane.

The studs may be positioned in such angular relation to the horizontal plane by proper disposition or configuration of the stud supporting plates 32. Thus, the upper surfaces of these plates may be machined to slope upwardly and inwardly toward the tube at such small acute angle. Alternatively, the upper edges of members 14 may be cut at such angle so that the shelves 31, and thus plates 32, have the desired inclination.

The intermediate plates 36 serve as alignment bars to align all the stud ends at a uniform set distance from the tube surface. With the usual tolerances in cutting the studs, some studs will thus touch the tube surface while the shorter studs will be out of contact with such surface. These plates, as well as bottom plates 32, are clamped in position on shelves 31 by cover plates 37 held by cap bolts 39.

To allow for the upward bowing of studs 30 when the weld deposits contract, clamping bars 36 may be made somewhat thicker than the studs. Thereby, cover plates 37 are spaced sufficiently above the studs to accommodate such stud movement. It will be understood that plates 36 and 37 can be made as a single member, rather than as separate elements.

Spaced laterally from frame 10 is a second and somewhat higher frame, generally indicated at 40, which may also be constructed in mating sections and serves as a support for the welding apparatus. Frame 40 includes columns 41, lower horizontally extending arms 42, and upper horizontally extending arms 43. Arms 42 carry structural supports 44 which support an inverted channel shaped track 45 extending parallel to jig 15. Arms 43 support an I-beam tram rail 46 for trolleys 47 which support the welding current conductors 48 providing current to the welding apparatus generally indicated at 50.

Track 45 movably supports a carriage 55 having supporting wheels 51 riding on the upper surface of the track. The carriage is moved along the track by gears 56 engaging a rack 57 on the upper surface of track 45, gears 56 being power driven by a suitable drive motor 58. The carriage is further supported by depending arms 61 carrying grooved rollers 62 riding along the edges of flange 63 of I-beam frame members 12. Depending arms 64 on the carriage carry rollers 66 engaging beneath the flanges of inverted channel track 45 to lock the carriage to track 45.

Arms 67 and 68 are hinged to either end of carriage 55 and their free ends are supported by rollers 71 riding on the upper space of track 45. Arm 67 supports a bracket 72 which carries a reel 65 having welding electrode wire 73 wound thereon. Arm 68 has a column 74 supporting a bracket 76 rotatably mounting a reel 70 carrying continuous welding electrode wire 77.

The intermediate portion of the carriage 55 supports a control panel 75 for the welding apparatus, which includes a pair of oppositely directed and laterally offset welding rod feeding mechanisms or welding heads 80 and 85. Welding electrode wire 73 is fed to head 80 through an insulating sleeve 78, whereas welding electrode wire 77 is fed to head 85 through an insulating sleeve 81. The electrode guiding means 82 and 83 of the welding heads 80 and 85 are so disposed as to direct electrodes 73 and 77, respectively, in converging relation toward the welding grooves formed on each side of tube 20 between the tube wall and the flat ends of studs 30. Preferably each welding head feeds its electrode toward the welding groove at an inclination of approximately 4° to the vertical. A hopper 84 is provided with a nozzle 86 for feeding a supply of granular fusible welding material to the weld zone to cover the tube and the stud ends in advance of the welding points. The welding is effected in the usual submerged arc welding manner wherein the arc is substantially submerged beneath a blanket of granular fusible welding material.

To maintain the tube fixed during the welding of the studs 30 thereto, a spring biased hold-down means, generally indicated at 90, is provided to engage the tube in advance of the welding zone. Hold-down means 90 holds tube 20 down in the jig so that studs 30 lie adjacent the tube horizontal axial plane. This hold-down means includes a depending bracket 91 on carriage 55 and which swingably supports an arm 92 carrying a roller 95 engageable with the top of tube 20. The inner end of arm 92 is pivotally secured to a nut 93 engaged on a screw 94 which extends through a horizontal bracket 96 on the leading end of carriage 55. A coil spring 97 embraces screw 94 above bracket 96, and the spring sets beneath a washer 98 held in place by a nut 99. A handle 100 is provided on the other end of screw 94 for adjusting the compression of spring 97 and thus the force with which roller 95 is spring biased against tube 20.

In the operation of the apparatus, tube 20 is placed in its supporting cradles and held therein by clamps 27. The studs 30 are then positioned and held with their outer ends in alignment and with the studs directed at the proper acute angle to the tube surface, as previously described. Carriage 55 is moved to the starting or leading end of tube 20, which is the left end as viewed in Fig. 1. Welding material or flux from hopper 84 is then discharged through nozzle 86 onto the work, as by means of a suitable control valve. The control panel is then used to inch the welding electrodes 73 and 77 toward the welding grooves, to compress arc initiating steel wool pads beneath the electrodes. The hold-down roller 95 is adjusted to exert the desired downward pressure on the tube at a position ahead of the welding zone and in advance of the flux deposition point. Suitable controls on panel 75 are then operated to start the carriage driving motor 58 and the welding heads 80 and 85. The resulting submerged arc welding operation then proceeds along the tube 20 and the two rows of contiguous studs 30. As the stud ends are progressively welded to the tube, the clamps 27 are successively released to allow the welded portion of the tube to bow upwardly as the result of the unbalanced heat therein due to the welding. When the welds are completed, the studded tube may be straightened in a known manner and additional rows of studs welded thereto, if desired.

While a specific embodiment of the invention has been shown and described in detail to illustrate the application of the invention principles, it will be understood that the invention may be embodied otherwise without departing from such principles.

We claim:

1. Stud welding apparatus comprising, in combination, a supporting frame; an elongated substantially trough shaped jig member mounted on said supporting frame for adjustment about a longitudinal axis; cradles in said jig arranged to receive a tube; a pair of first plates mounted in said member on either side of the tube and extending longitudinally thereof, the upper surface of each of said plates extending upwardly and inwardly at a small acute angle to the horizontal axial plane through the tube, and arranged to have a row of contiguous studs disposed thereon with their ends juxtaposed the surface of the tube; a pair of second plates each mounted for lateral movement on a first plate to engage the outer ends of the studs to align the outer ends of the studs; a pair of third plates each overlying a first plate; clamping means compressing each first and third plates against a second plate to clamp the second plates in stud end aligning position; and a pair of electric welding heads mounted for movement along the workpiece and each arranged to feed a consumable electrode toward a different one of the lines of juxtaposition of the stud inner ends and the tube surface whereby, during travel of the welding heads along the tube, both rows of studs are fusion welded to the tube.

2. Stud welding apparatus comprising, in combination, a supporting frame; an elongated substantially trough shaped jig member mounted on said supporting frame; cradles in said jig member arranged to receive an elongated tubular workpiece; a pair of first plates mounted in said jig member on either side of the workpiece and extending longitudinally thereof, the upper surfaces of each of said plates extending upwardly and inwardly at a small acute angle to the horizontal axial plane through the tubular workpiece, and arranged to have a row of contiguous studs disposed thereon with their ends juxtaposed to the surface of the workpiece; a pair of second plates each mounted for lateral movement on a first plate to engage the outer ends of the studs to align the stud outer ends; a pair of third plates each overlying a first plate; clamping means compressing each first and third plates against a second plate to clamp the second plates in stud end aligning position, the thickness of said second plates being greater than that of the studs to allow heat-influenced movement of said studs between and normal to said first and third plates; releasable means clamping the workpiece in said cradles at spaced points along the workpiece; a pair of electric welding heads mounted for movement along the workpiece and each arranged to feed a consumable electrode toward a different one of the lines of juxtaposition of the stud inner ends and the workpiece whereby, during travel of the welding heads along to the workpiece, both rows of studs are fusion welded to the workpiece; and means movable with said welding heads and engaging the workpiece adjacent the welding zone to hold the workpiece firmly in said cradles; said clamping means being successively releasable to provide for bowing of the workpiece as the studs are successively welded thereto.

3. Stud welding apparatus comprising, in combination, a supporting frame; an elongated substantially trough shaped jig member mounted on said supporting frame; cradles in said jig member arranged to receive an elongated tubular workpiece; a pair of first plates mounted in said jig member on either side of the workpiece and extending longitudinally thereof, the upper surface of each of said plates extending upwardly and inwardly at a small acute angle to the horizontal axial plane through the tubular workpiece, and arranged to have a row of contiguous studs disposed thereon with their ends juxtaposed to the surface of the workpiece; a pair of second plates each mounted for lateral movement on a first plate to engage the outer ends of the studs to align the stud outer ends; a pair of third plates each overlying a first plate; clamping means compressing each first and third plates against a second plate to clamp the second plates in stud end aligning position, the thickness of said second plates being greater than that of the studs to allow heat-influenced movement of said studs between and normal to said first and third plates; releasable means clamping the workpiece in said cradles at spaced points along the workpiece; a pair of electric welding heads mounted for movement along the workpiece and each arranged to feed a consumable electrode toward a different one of the lines of juxtaposition of the stud inner ends and the workpiece whereby, during travel of the welding heads along to the workpiece, both rows of studs are fusion welded to the workpiece; and spring biased roller means movable with said welding heads and engaging the workpiece adjacent the welding zone to hold the workpiece firmly in said cradles; said clamping means being successively releasable to provide for bowing of the workpiece as the studs are successively welded thereto.

4. Stud welding apparatus comprising, in combination, a supporting frame; an elongated substantially trough shaped jig member mounted on said supporting frame; cradles in said jig member arranged to receive an elongated tubular workpiece; a pair of first plates mounted in said jig member on either side of the workpiece and extending longitudinally thereof, the upper surface of each of said plates extending upwardly and inwardly at a small acute angle to the horizontal axial plane through the tubular workpiece, and arranged to have a row of contiguous studs disposed thereon with their ends juxtaposed to the longitudinal surface of the workpiece; a pair of second plates each mounted for lateral movement on a first plate to engage the outer ends of the studs to align the stud outer ends; a pair of third plates each overlying a first plate; clamping means compressing each first and third plates against a second plate to clamp the second plates in stud end aligning position; a track extending parallel to said jig member; a carriage movable along said track; a pair of electric welding heads mounted on said carriage and each arranged to feed a consumable electrode toward a different one of the lines of juxtaposition of the stud inner ends and the workpiece whereby, during travel of the carriage parallel to the workpiece, both rows of studs are fusion welded to the workpiece; releasable means clamping the workpiece in said cradles at spaced points along the workpiece; spring biased roller means carried by said carriage and engaging the workpiece adjacent the welding zone to hold the workpiece firmly in said cradles; a hopper mounted on said carriage and containing a supply of granular welding material; and means for delivering material from said hopper to the workpiece and both sets of stud ends adjacent the fusing ends of the electrodes; said clamping means being successively releasable to provide for bowing of the workpiece as the studs are successively welded thereto.

References Cited in the file of this patent

UNITED STATES PATENTS

| Number | Name | Date |
| --- | --- | --- |
| 1,612,317 | Reed | Dec. 28, 1926 |
| 1,797,795 | Ruhr | Mar. 24, 1931 |
| 2,107,435 | Birmingham | Feb. 8, 1938 |
| 2,357,376 | Baird | Sept. 5, 1944 |
| 2,364,826 | Smith | Dec. 12, 1944 |